US009927997B2

(12) United States Patent
Filderman et al.

(10) Patent No.: US 9,927,997 B2
(45) Date of Patent: Mar. 27, 2018

(54) METHODS, SYSTEMS, AND COMPUTER READABLE MEDIA FOR AUTOMATICALLY AND SELECTIVELY ENABLING BURST MODE OPERATION IN A STORAGE DEVICE

(71) Applicant: SanDisk Technologies LLC, Plano, TX (US)

(72) Inventors: David Filderman, Kirvat Yam (IL); Samia Hussein Abbas, Abu Sinan Village (IL)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 14/977,559

(22) Filed: Dec. 21, 2015

(65) Prior Publication Data
US 2017/0177261 A1     Jun. 22, 2017

(51) Int. Cl.
G06F 3/06    (2006.01)

(52) U.S. Cl.
CPC ............ *G06F 3/0634* (2013.01); *G06F 3/061* (2013.01); *G06F 3/0653* (2013.01); *G06F 3/0673* (2013.01)

(58) Field of Classification Search
CPC .... G06F 3/0613; G06F 3/0634; G06F 3/0659; G06F 3/0673; G06F 3/0653; G06F 3/061
See application file for complete search history.

(56) References Cited

U.S. PATENT DOCUMENTS

| 5,727,233 | A  | * | 3/1998  | Lynch    | G06F 13/385 |
|-----------|----|---|---------|----------|-------------|
|           |    |   |         |          | 710/35      |
| 6,826,636 | B2 | * | 11/2004 | Liang    | G06F 9/30043 |
|           |    |   |         |          | 710/33      |
| 6,954,818 | B2 | * | 10/2005 | Kent     | G06F 13/4027 |
|           |    |   |         |          | 710/306     |
| 7,743,038 | B1 |   | 6/2010  | Goldick  |             |
| 7,937,393 | B2 |   | 5/2011  | Prahlad et al. |       |
| 8,775,741 | B1 |   | 7/2014  | de la Iglesia |        |
| 2003/0188184 | A1 |  | 10/2003 | Strongin et al. |     |
| 2006/0106984 | A1 |  | 5/2006  | Bartley et al. |      |
| 2008/0320211 | A1 |  | 12/2008 | Kinoshita |          |
| 2009/0031083 | A1 |  | 1/2009  | Willis et al. |       |
| 2009/0228875 | A1 |  | 9/2009  | DeVries  |             |
| 2010/0262721 | A1 |  | 10/2010 | Asnaashari et al. |   |
| 2011/0296088 | A1 |  | 12/2011 | Duzly et al. |        |

(Continued)

OTHER PUBLICATIONS

Non-Final Office Action for U.S. Appl. No. 14/297,563 (dated Dec. 4, 2015).

(Continued)

*Primary Examiner* — Shelly A Chase
(74) *Attorney, Agent, or Firm* — Loza & Loza, LLP; Gabriel Fitch

(57) ABSTRACT

The subject matter described herein relates to methods, systems, and computer readable media for automatically and selectively enabling burst mode operation in a storage device. One method includes monitoring data written by a host device to a storage device. The method further includes determining whether the data is of a type for which burst mode operation of the storage device is indicated. The method further includes, in response to determining that the data is of a type for which burst mode operation is indicated, automatically enabling burst mode operation of the storage device.

21 Claims, 4 Drawing Sheets

(56) References Cited

U.S. PATENT DOCUMENTS

| | | |
|---|---|---|
| 2011/0320685 A1 | 12/2011 | Gorobets et al. |
| 2012/0051137 A1 | 3/2012 | Hung et al. |
| 2012/0144092 A1 | 6/2012 | Hsieh et al. |
| 2012/0284587 A1 | 11/2012 | Yu et al. |
| 2012/0317335 A1 | 12/2012 | Cho |
| 2013/0080732 A1 | 3/2013 | Nellans et al. |
| 2013/0086311 A1 | 4/2013 | Huang et al. |
| 2013/0138867 A1 | 5/2013 | Craft et al. |
| 2013/0262533 A1 | 10/2013 | Mitra et al. |
| 2013/0275672 A1 | 10/2013 | Bert |
| 2013/0297852 A1 | 11/2013 | Fai et al. |
| 2014/0149641 A1 | 5/2014 | Avila et al. |
| 2014/0289492 A1 | 9/2014 | Ranjith Reddy et al. |
| 2014/0337560 A1 | 11/2014 | Chun et al. |
| 2015/0199269 A1 | 7/2015 | Bert et al. |
| 2015/0356020 A1 | 12/2015 | Desai et al. |
| 2016/0026406 A1 | 1/2016 | Hahn et al. |
| 2016/0054931 A1 | 2/2016 | Romanovsky et al. |
| 2016/0054934 A1 | 2/2016 | Hahn et al. |
| 2016/0246726 A1 | 8/2016 | Hahn |

OTHER PUBLICATIONS

Non-Final Office Action for U.S. Appl. No. 14/464,584 (dated Dec. 4, 2015).

Commonly-assigned, co-pending U.S. Appl. No. 14/555,548 for "Storage Devices and Methods for Optimizing Use of Storage Devices Based on Storage Device Parsing of File System Metadata in Host Write Operations," (Unpublished, filed Nov. 26, 2014).

"Ext4 Disk Layout," https://ext4.wiki.kernel.org/index.php/Ext4_Disk_Layout, Wikipedia, pp. 1-28 (Nov. 17, 2014).

"NVM Express Overview," NVM Express, pp. 1-2 (copyright 2013).

"CreateFile function," Microsoft, Windows Dev Center, https://msdn.microsoft.com/en-us/library/windows/desktop/aa363858(v=vs.85).aspx, pp. 1-20 (2008).

"NVM Express," Specification Revision 1.2, http://nvmexpress.org/wp-content/uploads/NVM_Express_1_2_Gold_20141209.pdf, pp. 1-205 (Nov. 3, 2014).

"I/O Limits: block sizes, alignment and I/O hints," Red Hat, http://people.redhat.com/msnitzer/docs/io-limits.txt, pp. 1-4 (Jan. 14, 2013).

"Understanding the Flash Translation Layer (FTL) Specification," AP-684 Application Note, Intel, pp. 1-20 (Dec. 1998).

Notice of Allowance and Fees Due for U.S. Appl. No. 14/297,563 (dated Jul. 25, 2016).

Non-Final Office Action for U.S. Appl. No. 14/555,548 (dated Jul. 5, 2016).

"NVM Express," Specification Revision 1.2.1, http://www.nvmexpress.org/wp-content/uploads/NVM_Express_1_2_1_Gold_20160603.pdf, pp. 1-217 (Jun. 5, 2016).

Final Office Action for U.S. Appl. No. 14/464,584 (dated Apr. 26, 2016).

Final Office Action for U.S. Appl. No. 14/297,563 (dated Apr. 13, 2016).

Non-Final Office Action for U.S. Appl. No. 14/814,460 (dated Mar. 28, 2016).

Prabhakaran et al., "Analysis and Evolution of Journaling File Systems," 2005 USENIX Annual Technical Conference, pp. 105-120 (2005).

Notice of Allowance and Fees Due for U.S. Appl. No. 14/814,460 (dated Sep. 23, 2016).

* cited by examiner

| | | | |
|---|---|---|---|
| FFD8FFE0 | 00104A46 | 49460001 | 01010060 |
| 00600000 | FFDB0043 | 00010101 | 01010101 |
| 01010101 | 01010101 | 01010101 | 01010101 |
| 01010101 | 01010101 | 01010101 | 01010101 |
| 01010101 | 01010101 | 01010101 | 01010101 |
| 01010101 | 01010101 | 01FFDB00 | 43010101 |
| 01010101 | 01010101 | 01010101 | 01010101 |
| 01010101 | 01010101 | 01010101 | 01010101 |
| 01010101 | 01010101 | 01010101 | 01010101 |
| 01010101 | 01010101 | 01010101 | 0101FFC0 |
| 00110801 | 9000E503 | 01220002 | 11010311 |
| 01FFC400 | 1F000001 | 05010101 | 01010100 |
| 00000000 | 00000001 | 02030405 | 06070809 |
| 0A0BFFC4 | 00B51000 | 02010303 | 02040605 |
| 05040400 | 00017D01 | 02030004 | 11051221 |
| 31410613 | 51610722 | 71143281 | 91A10823 |
| 42B1C115 | 52D1F024 | 33627282 | 090A1617 |
| 18191A25 | 26272829 | 2A343536 | 3738393A |
| 43444546 | 4748494A | 53545556 | 5758595A |
| 63646566 | 6768696A | 73747576 | 7778797A |
| 83848586 | 8788898A | 92939495 | 96979899 |
| 9AA2A3A4 | A5A6A7A8 | A9AAB2B3 | B4B5B6B7 |
| B8B9BAC2 | C3C4C5C6 | C7C8C9CA | D2D3D4D5 |
| D6D7D8D9 | DAE1E2E3 | E4E5E6E7 | E8E9EAF1 |
| F2F3F4F5 | F6F7F8F9 | FAFFC400 | 1F010003 |
| 01010101 | 01010101 | 01000000 | 00000001 |
| 02030405 | 06070809 | 0A0BFFC4 | 00B51100 |
| 02010204 | 04030407 | 05040400 | 01027700 |
| 01020311 | 04052131 | 06124151 | 07617113 |
| 22328108 | 144291A1 | B1C10923 | 3352F015 |
| 6272D10A | 162434E1 | 25F11718 | 191A2627 |
| 28292A35 | 36373839 | 3A434445 | 46474849 |

FIG. 1B

METHODS, SYSTEMS, AND COMPUTER READABLE MEDIA FOR AUTOMATICALLY AND SELECTIVELY ENABLING BURST MODE OPERATION IN A STORAGE DEVICE

TECHNICAL FIELD

The subject matter described herein relates to controlling operation of a storage device. More particularly, the subject matter described herein relates to automatically and selectively enabling burst mode operation in a storage device.

BACKGROUND

Storage devices, such as nonvolatile storage devices, are capable of switching modes of operation depending on data storage needs of a host device. One such mode of operation is burst mode operation. In burst mode operation, the storage device enables the host to write data more rapidly to the storage device than when the storage device is not in burst mode. One example of when it may be desirable to switch a storage device to burst mode operation is when the host device is writing a high resolution image or video file to the storage device.

One possible trigger for burst mode operation of the storage device is a command from the host device. For example, when the a host application, such as a photo management application, knows that it is going to write a high resolution image or video file to the storage device, the application may instruct the host to issue a command to the storage device to instruct the storage device to switch to burst mode operation. Requiring an express command from the host device to switch the storage device to burst mode operation is undesirable as it requires that the application on the host device include the intelligence as to how and when to instruct the host to issue a command to switch the storage device to burst mode operation. Many applications, such as those resident on digital cameras, lack the intelligence to determine when a storage device should be in burst mode, not to mention how to trigger burst mode operation. Even if the host application includes such intelligence, latency associated with issuing the command and receiving confirmation of the command from the storage device may delay the writing of the data to the storage device.

Another possible method for triggering the switching of the storage device to burst mode operation is by calculating the rate of data written over the data bus between the host device and the storage device. Calculating the data transfer rate can require a complex hardware or software implementation, which can increase the cost of the storage device and may delay the switching to burst mode operation.

Even if the host device is capable of commanding the storage device to switch to burst mode operation for video or image files, it may not be desirable to enable burst mode operation for all video or image files. For example, if the host is going to write a single small image file to the storage device, switching to burst mode operation may not be desirable.

Accordingly, in light of these difficulties, there exists a need for methods, systems, and computer readable media for automatically and selectively enabling burst mode operation in a storage device.

SUMMARY

The subject matter described herein relates to methods, systems, and computer readable media for automatically and selectively enabling burst mode operation in a storage device. One method includes monitoring data written by a host device to a storage device. The method further includes determining whether the data is of a type for which burst mode operation of the storage device is indicated. The method further includes, in response to determining that the data is of a type for which burst mode operation is indicated, automatically enabling burst mode operation of the storage device.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 1B is a diagram illustrating exemplary JPEG image data that may be used to determine whether burst mode operation should be automatically enabled by a storage device according to an embodiment of the subject matter described herein.

DETAILED DESCRIPTION

Figure 1A:
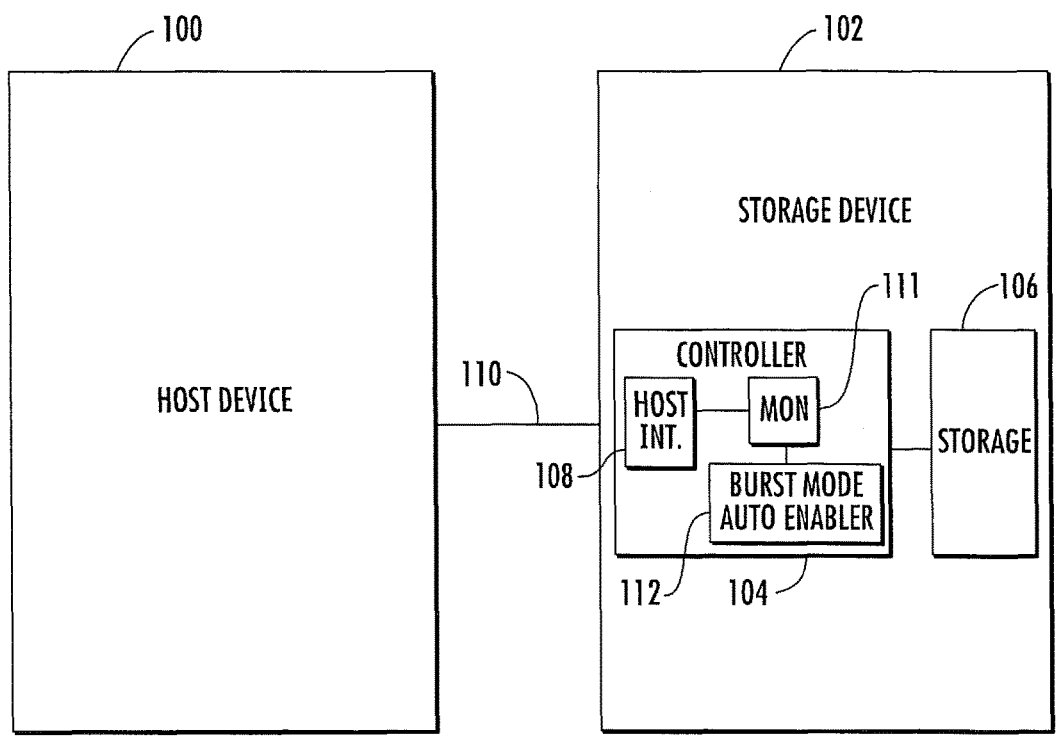
FIG. 1A is a block diagram illustrating a host device and a storage device capable of automatically and selectively enabling burst mode operation according to an embodiment of the subject matter described herein.

Methods, systems, and computer readable media for automatically and selectively enabling burst mode operation in a storage device are described. FIG. 1A is a block diagram of the host device and a storage device capable of automatically and selectively enabling burst mode operation according to an embodiment of the subject matter described herein. Referring to FIG. 1A, host device 100 may be any suitable device capable of writing data to and reading data from a storage device 102. In one example, host device may be a computer, such as a personal computer, a tablet computer, a smartphone, a camera, or other device that writes data, including image, audio, video, and other file types to storage device 102. Storage device 102 may be a nonvolatile storage device, such as a nonvolatile memory device. In one example, storage device 102 may be a nonvolatile memory card, such as a multimedia card (MMC). In another example, storage device 102 may be a solid state drive, a flash drive, or other device that includes nonvolatile storage.

In the illustrated example, storage device 102 includes a controller 104 and storage 106. Controller 104 may be a nonvolatile memory controller that controls access to storage 106. Storage 106 may be nonvolatile memory, such as flash memory, including two-dimensional flash memory, three-dimensional flash memory, or a combination thereof.

In the illustrated example, controller 104 includes a host interface 108 that receives data from host device 100 over data bus 110. Controller 104 further includes a data monitor 111 that monitors data written by host device 100 to storage device 102 via host interface 108. Data monitor 111 may monitor the data to determine whether the type of the data is one of a predetermined number of types for which burst mode operation is indicated. Monitoring the data to determine whether the type is the type for which burst mode operation is indicated may include, in one example, reading the first sector of data from a data file written by host device 100 to storage device 102. In some file types, for example, MPEG and JPEG, the first sector of data contains a signature that identifies the file type. For example, in JPEG, the first two bytes are FFD8, which identifies the file type as JPEG. FIG. 1B illustrates an example of the data in hexadecimal format that may be received by a storage device for a JPEG file. Table 1 illustrates data in the header of the JPEG file that may be used by data monitor 111 for determining whether or not to enable burst mode operation.

TABLE 1

FILE DATA FOR DETERMINING WHETHER
BURST MODE OPERATION IS INDICATED

| Offset | Size | Description |
|--------|------|-------------|
| 0 | 2 | JPEG SOI marker (FFD8 hex) |
| 2 | 2 | image width in pixels |
| 4 | 2 | image height in pixels |
| 6 | 1 | number of components (1 = grayscale, 3 = RGB) |
| 7 | 1 | horizontal/vertical sampling factors for component 1 |
| 8 | 1 | sampling factors for component 2 (if RGB) |
| 9 | 1 | sampling factors for component 3 (if RGB) |

In Table 1, the first two bytes identify the file type as JPEG. Accordingly, these two bytes may be analyzed by data monitor 111 to determine whether burst mode operation is indicated. During the command phase for a write command, data is divided into sectors of 512 bytes. After the first sector of data is written to the storage device, all of the information needed to determine whether burst mode should be enabled is in the first sector and available to the storage device. Accordingly, data monitor 111 may analyze the first sector of data of a file and may trigger, on the fly, the enablement of burst mode operation by burst mode auto enabler 112 for the remaining sectors in the file or until data is received for which burst mode is not indicated.

The remaining information in Table 1 may be used to determine an indication of resolution of the JPEG file to determine that even though the file type is JPEG, burst mode may or may not be indicated. For example, if the resolution is greater than a predetermined threshold, burst mode may be needed. However, if the resolution is not greater than the threshold, it may be desirable to refrain from switching into burst mode operation. In the illustrated example, the image width in pixels, the image height in pixels, the number of components, i.e., colors encoded in each pixel, the sampling factors for each component, etc., may be used by data monitor 111 as indicators of the resolution of the file to determine whether burst mode operation is indicated.

It may be desirable to enable burst mode for large JPEG or MPEG files, i.e., files that are on the order of megabytes or tens of megabytes. It may not be desirable to enable burst mode for smaller JPEG or MPEG files, i.e., files that are on the order of kilobytes because enabling burst mode for small files yields less of a performance advantage.

Accordingly, once data monitor 111 determines that the file type is JPEG, data monitor 111 may access more of the data to determine an indication of the resolution of the file. If the resolution is greater than the predetermined threshold value, and the file type is JPEG or MPEG, then burst mode operation may be indicated. If the resolution is low, or less than the threshold, burst mode operation may not be indicated.

Monitoring the first sector of data for the file type and resolution to determine whether burst mode operation is indicated is believed to be advantageous over conventional methods that require an express command from the host or that require computation of a data rate over data bus 110, as the present subject matter enables burst mode operation to be automatically enabled by the storage device in a rapid and efficient manner. In addition, utilizing data resolution to determine whether or not to enter burst mode provides the advantage of only enabling burst mode operation when it would be advantageous to do so.

Once data monitor 111 determines that burst mode operation is indicated, burst mode auto-enabler 112 may automatically enable storage device 102 to operate in burst mode. Operating in burst mode may include controller 104 signaling host device 100 to write data rapidly to storage device 102.

Figure 2A:
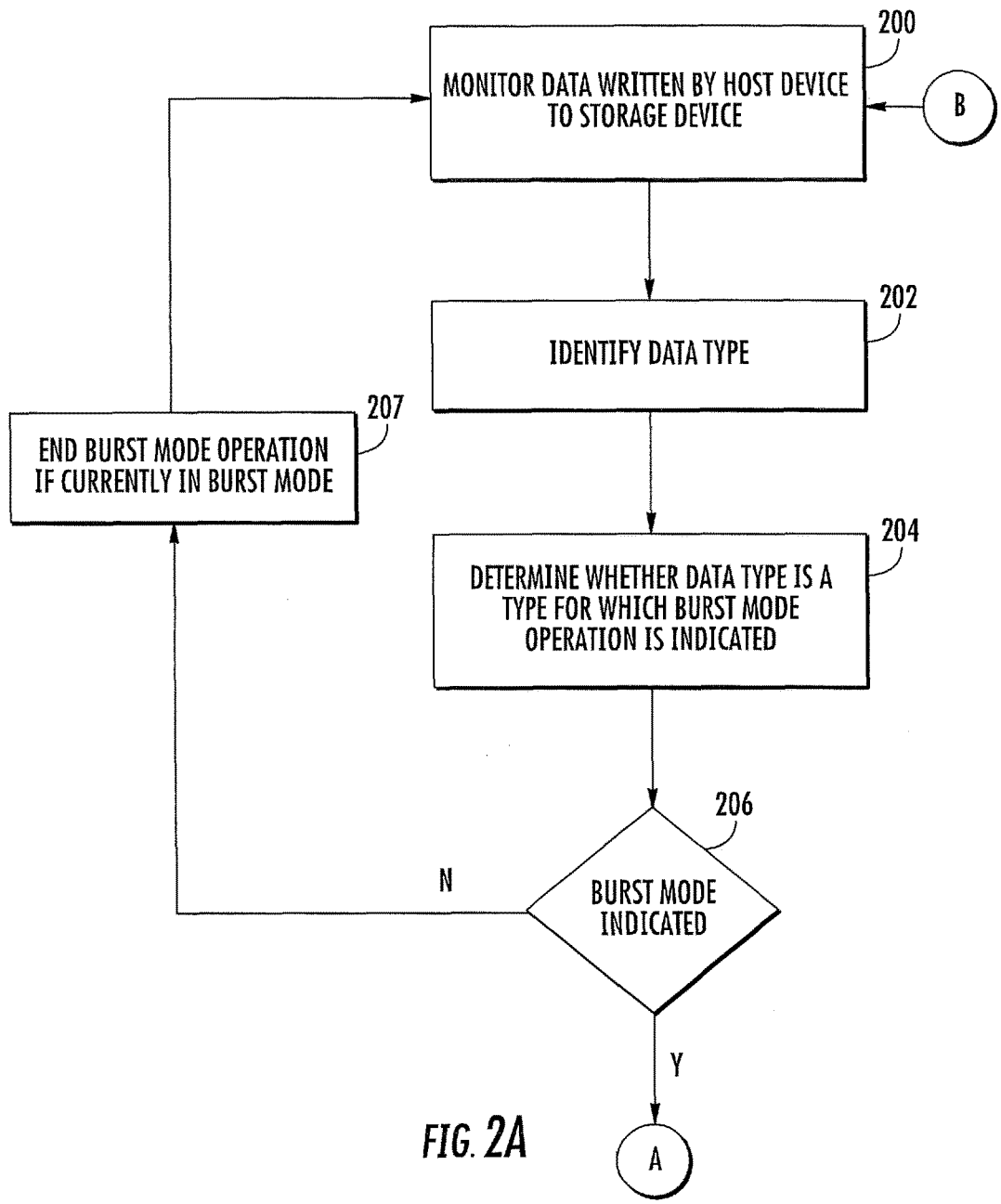
FIGS. 2A and 2B are a flow chart illustrating a process for automatically and selectively enabling burst mode operation of the storage device according to an embodiment of the subject matter described herein.
Figure 2B:
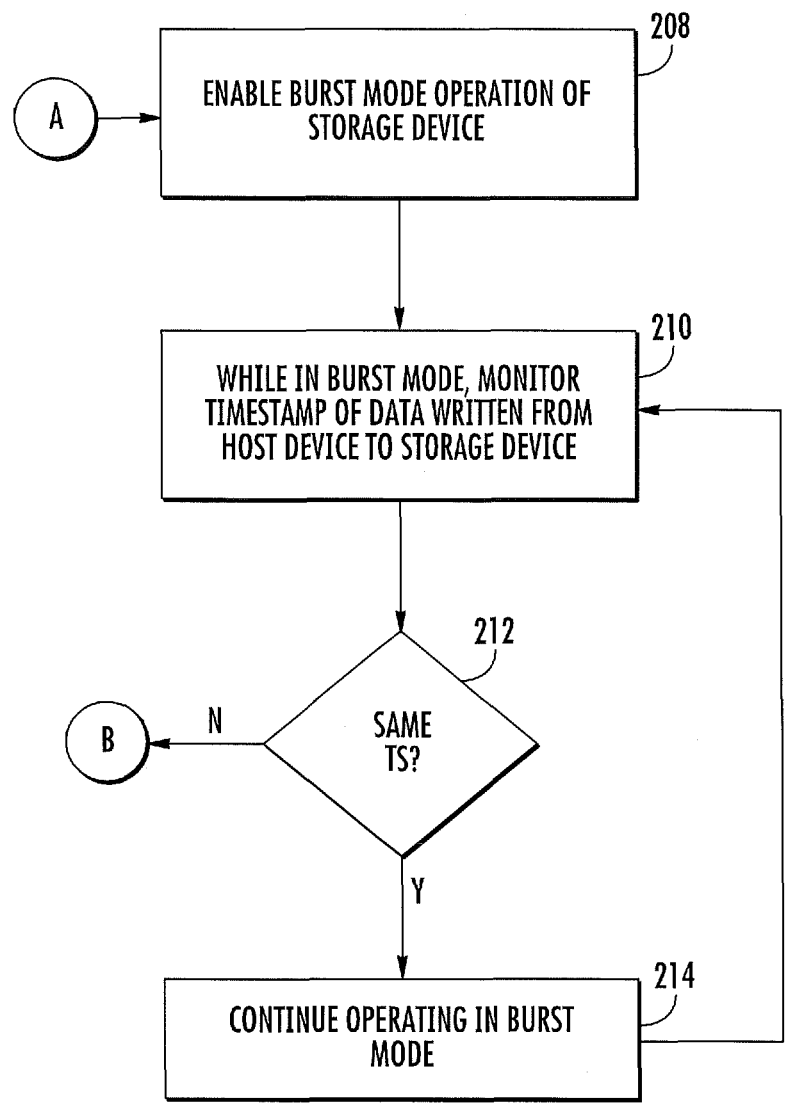

FIGS. 2A and 2B are a flow chart illustrating an exemplary process for automatically and selectively enabling burst mode operation according to an embodiment of the subject matter described herein. Referring to FIG. 2A in step 200, data written by the host device to the storage device is monitored. For example, data monitor 111 as illustrated in FIG. 1A, may monitor data written by host device 100 over data bus 110 to storage device 102. In one example, data monitor 111 may examine the first sector of a file written by the host device to the storage device. In step 202, the data type is identified. As stated above, the data type may be identified by searching the first sector of data of a file to determine a file signature that indicates the file type. Identifying the data type may also include identifying the resolution of the data.

In step 204, it is determined whether the data type is a type for which burst mode operation is indicated. For example, if the file is a high resolution JPEG or MPEG file, burst mode operation may be indicated. Data monitor 111 may examine the file signature and compare the file signature to a table of file type signatures stored by the storage device to determine whether the file signature of the incoming data matches one of the stored file type signatures for which burst mode operation is indicated. If the file type signature of the incoming data matches one of the file type signatures for which burst mode operation is indicated, data monitor 111 may determine the resolution or size of the file to determine whether the resolution or size exceeds a threshold (maintained by the storage device and possibly configurable) for which burst mode operation is indicated. If the file is of a type for which burst mode operation is indicated but the size or resolution of the incoming data does not exceed the threshold, data monitor 111 may determine that burst mode operation is not indicated.

In step 206, if burst mode operation is not indicated, the monitoring of data in step 200 continues without switching to burst mode. If the storage device is currently in burst mode, and the currently received data is not data for which burst mode is indicated, the storage device may exit burst mode operation, as indicated by step 207. Automatically exiting burst mode operation when burst mode is no longer needed further increases the efficiency of the utilization of the storage device.

If the file is of a type for which burst mode operation is indicated and the size or resolution of the incoming data exceeds the threshold, data monitor 111 may determine that burst mode operation is indicated. If burst mode is indicated, control proceeds to step 208 in FIG. 2B where burst mode operation of the storage device is enabled. Step 208 may be performed by burst mode auto enabler 112 illustrated in FIG. 1A in response to a determination by data monitor 111 that burst mode operation is indicated. In step 210, the timestamps of data written from the storage device to the host device are monitored while the storage device is in burst mode. In step 212, if the timestamps are the same as the data that originally triggered burst mode operation, control proceeds to step 214 where the storage device remains in burst mode and then to steps 210 and 212 where the timestamp of data written by the host device to the storage device is continually monitored. If the timestamp changes, indicating a new file, control returns to step 200 where the new file is analyzed to determine whether burst mode is indicated for the new file type. If burst mode is not indicated, burst mode operation may be ended, as indicated by step 207.

Accordingly, the subject matter described herein, by automatically and selectively enabling burst mode operation, achieves an advantage over conventional methods that require either the application or detailed monitoring of the data rate to enable burst mode operation. Such methods and systems improve the functionality of storage devices, such as nonvolatile storage devices that are capable of operating in burst mode. In addition, by automatically enabling burst mode operation on the fly after receiving the first sector of data of a file, a storage device according to an embodiment of the subject matter described herein allows burst mode operation to be enabled as a file is being written to the storage device based on the content of the file itself. Such selective enablement (and disablement) of burst mode operation on a file by file basis may increase storage device utilization efficiency and correspondingly increase host device performance.

The subject matter described herein for automatically and selectively enabling burst mode operation can be implemented for a storage device, such as a semiconductor memory device, including any suitable NAND flash memory, including 2D or 3D NAND flash memory. Semiconductor memory devices suitable for use with the subject matter described herein include volatile memory devices, such as dynamic random access memory ("DRAM") or static random access memory ("SRAM") devices, nonvolatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method comprising:
monitoring data received at a storage device, the monitoring comprising identifying a file signature in the date, the file signature corresponding to a file type;
determining whether the file type indicates burst mode operation of the storage device; and
enabling burst mode operation in the storage device in response to determining that the file type indicates burst mode operation of the storage device.

2. The method of claim 1, wherein:
the monitoring further comprises analyzing a first portion of a data file at the storage device; and
burst mode operation is enabled in the storage device for writing a remaining portion of the data file to the storage device.

3. The method of claim 1, wherein the monitoring further comprises reading the file signature at a predetermined offset within a data sector received at the storage device.

4. The method of claim 1, the method further comprising:
determining that the file type indicates burst mode operation of the storage device in response to the file type corresponding to one or more of: a video file and an image file.

5. The method of claim 1, further comprising:
determining a resolution of one or more of a video file and an image file in response to identifying the file signature; and
comparing the determined resolution to a threshold.

6. The method of claim 5, further comprising:
enabling burst mode operation in the storage device in response to the determined resolution exceeding the threshold; and
refraining from enabling burst mode operation in the storage device in response to the determined resolution failing to exceed the threshold.

7. The method of claim 1, further comprising:
reading one or more of: the file signature, a file size, a component count, a scaling factor, an image width, an image height, an image resolution, and a video resolution corresponding to the file type from the data received at the storage device; and
determining that the file type indicates burst mode operation of the storage device in respond to reading one or more of the: file signature, file size, component count, scaling factor, image width, image height, image resolution, and video resolution.

8. The method of claim 1, wherein enabling burst mode operation comprises:
enabling burst mode operation by the storage device without requiring a command from a host device to switch the storage device to burst mode operation.

9. The method of claim 1, wherein the storage device comprises a nonvolatile storage device having a controller and nonvolatile flash memory.

10. The method of claim 1, further comprising:
enabling burst mode operation in the storage device in response to monitoring first data associated at the storage device, the first data associated with a first timestamp; and
continuing burst mode operation while timestamps of data being written to the storage device correspond to the first timestamp.

11. A storage device, comprising:
a controller configured to control access to a memory; and
a data monitor configured to detect data corresponding to burst mode operation of the storage device, the data monitor to:
monitor data received from a host device;
identify file data within the monitored data; and
determine whether the identified file data corresponds to burst mode operation of the storage device;
wherein the controller is further configured to enable burst mode operation in the storage device in response to the data monitor detecting data corresponding to burst mode operation of the storage device.

12. The storage device of claim 11, wherein:
the data monitor identifies the file data within a first data sector of a data file; and the controller enables burst mode operation of the storage device for writing a second data sector of the data file to the storage device in response to the identified file data of the first data sector corresponding to burst mode operation of the storage device.

13. The storage device of claim 11, wherein:
the data monitor is configured to read one or more of: a file signature, a file size, a video resolution, an resolution, an image width, an image height, a component number, and a component sampling factor from respective offsets within the monitored data.

14. The storage device of claim 11, wherein the identified file data corresponds to one or more of: a video file and an image file.

15. The storage device of claim 11, wherein the data monitor is further configured to analyze the monitored data to identify file data comprising one or more of: a file signature, a file size, a video resolution, an image resolution, an image width, an image height, a component count, and a sampling factor.

16. The storage device of claim 15, wherein the data monitor is configured to determine whether the file data corresponds to burst mode operation of the storage device based on one or more of the: file signature, file size, video resolution, image resolution, image width, image height, component count, and sampling factor of the identified file data.

17. The storage device of claim 11, wherein:
the identified file data indicates a resolution of one or more of a video file and an image file; and
the data monitor is configured to determine whether the identified file data corresponds to burst mode operation of the storage device based on the indicated resolution.

18. The storage device of claim 11, further comprising:
a host interface configured to communicatively couple the storage device to a host device; and
wherein the controller is configured to enable burst mode operation in the storage device independent of a command from the host device to switch the storage device to burst mode operation.

19. The storage device of claim 11, wherein the memory comprises one or more of: a nonvolatile flash memory, a two-dimensional nonvolatile memory array, and a three-dimensional nonvolatile memory array.

20. The storage device of claim 11, wherein the controller is further configured to:
enable burst mode operation in the storage device in response to the data monitor detecting first data associated with a first timestamp; and
continue burst mode operation of the storage device while timestamps associated with data being written to the storage device are equivalent to the first timestamp.

21. A non-transitory computer readable medium having stored thereon instructions configured to cause a processor to perform operations, comprising:
monitoring data written to a storage device, the monitoring comprising reading a file header from a first portion of file data written to the storage device;
determining whether the file header corresponds to burst mode operation of the storage device; and
enabling burst mode operation in the storage device in response to determining that the file header corresponds to burst mode operation of the storage device such that burst mode operation of the storage device is enabled for writing a second portion of the file data to the storage device.

* * * * *